Nov. 27, 1951 V. I. ZELOV 2,576,873
SUPPORT
Filed Oct. 31, 1947
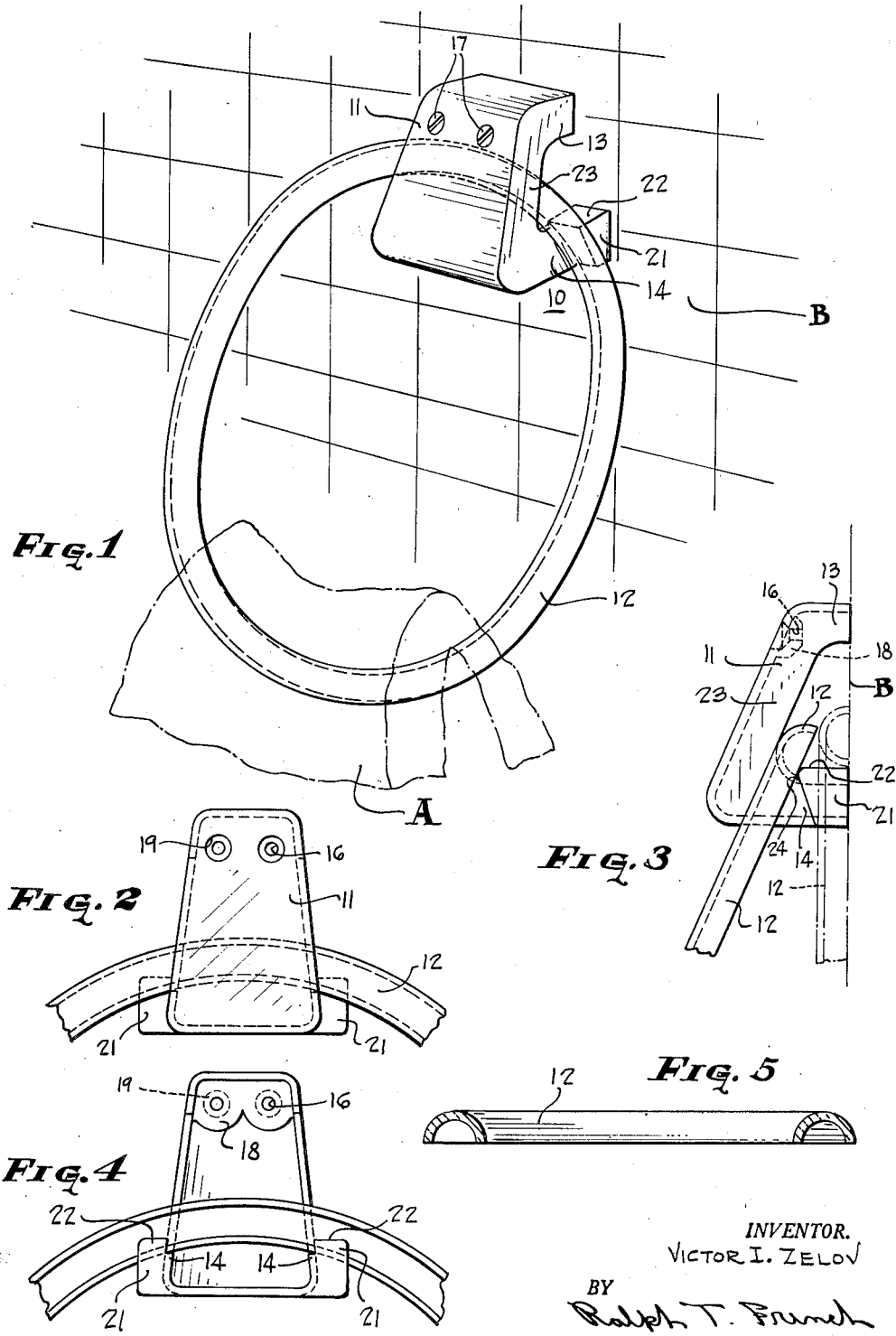
INVENTOR.
VICTOR I. ZELOV
BY Robert T. French
ATTORNEY.

Patented Nov. 27, 1951

2,576,873

UNITED STATES PATENT OFFICE 2,576,873

SUPPORT

Victor I. Zelov, Rosemont, Pa.

Application October 31, 1947, Serial No. 783,307

4 Claims. (Cl. 211—87)

This invention relates to supports, more particularly to supports for towels, garments, neckties and any articles which may be folded over a supporting structure, and has for an object to provide improved apparatus of this character.

Another object of the invention is to provide a support adapted to be secured to a vertical surface such as the wall of a room, or the like, and when in use to project outwardly from such wall sufficiently to retain the article supported thereby substantially out of contact with the wall, and when not in use to lie close to the wall and out of the way.

Yet another object of the invention is to provide a support for towels and the like, which support is not only practical but is highly ornamental, and hence particularly suitable for use in modern bathrooms and kitchens.

These and other objects are effected by the invention as will be apparent from the following description and claims, taken in accordance with the accompanying drawings forming a part of this application, and in which:

Fig. 1 is a perspective view of a towel support embodying the principles of the present invention;

Fig. 2 is a fragmentary front elevational view of the apparatus shown in Fig. 1;

Fig. 3 is a fragmentary side elevational view of the structure shown in Fig. 1, with an inoperative position of the supporting ring shown in dot-dash lines;

Fig. 4 is a rear elevational view of the structure shown in the preceding figures; and, Fig. 5 is a transverse sectional view through the supporting ring, showing the cross section of the latter.

Referring now to the drawings more in detail, the reference character 10 indicates, in its entirety, a supporting device for a towel, garment, necktie, or the like, indicated by dot-dash lines, at A.

The supporting device 10 comprises a bracket 11 of generally U-shape and a supporting loop member 12 whose upper portion is disposed in the space between the legs 13 and 14 of the U-shaped bracket. Preferably, the outer ends of the legs 13 and 14 lie in a common plane and are adapted to abut a vertical supporting surface, such as a bathroom or kitchen wall B, or the like.

One or more openings 16 are provided in the upper portion of the bracket for passage therethrough of screws 17, or similar means for securing the bracket 11 to the wall B with the leg 13 above the leg 14. Where the bracket is molded, cast, or fabricated of plastic, such as any of the now well-known thermoplastic or thermosetting materials, it may be desirable to provide a boss 18 (Figs. 3 and 4) through which the screw holes 16 extend, these holes being counterbored at the front of the bracket, as at 19, for reception of the heads of the screws 17.

The lower leg 14 is provided at its outer free end with a pair of lugs 21 projecting laterally from opposite sides thereof, these lugs 21 having upper surfaces 22 at slightly higher levels than the upper surface of the arm 14, as best shown in Figs. 3 and 4 and providing, in effect, the upper step of a pair of steps. The upper surfaces 22 terminate short of the U bottom 23, and provide therebetween a notch 24 whose rear wall constitutes a riser for the pair of steps.

The upper portion of the loop member 12 is of non-circular cross section, as shown in Figs. 3 and 5, and this cross section and the notch 24 are of such relative shapes and sizes that when the loop member 12 is disposed in the notch, as shown in full lines in Fig. 3, the loop member is held in tilted or inclined position relative to the vertical with the lower portion of the loop member sufficiently far from the wall B that the article A supported by the loop member hangs free of the wall.

It will be apparent from consideration of Fig. 3 that when the loop member is raised slightly from its full line position its upper portion will be moved from the notch 24 to upper surfaces 22 of the lugs 21, where it will be free to assume a substantially vertical position in close proximity to the wall B and well out of the way.

As suggested above, either or both the bracket 11 and the loop member 12 may be made of any of the various plastics now on the market, and when so made may be transparent or colored to harmonize with the tile work or other decorations of the room in which the device is used.

It will be apparent to those skilled in the art that the loop member 12 need not be circular in shape, as shown, nor semi-circular in cross section, and throughout the specification and claims the term "loop member" means any member having an upper portion capable of being supported by a bracket such as shown and having a lower portion having a bar capable of supporting a towel, necktie, garment or similar article folded thereover. For example, the loop member might be in the shape of a stirrup or of the letter S.

What is claimed is:

1. Apparatus of the character described comprising a U-shaped supporting bracket having upper and lower legs and an opening extending transversely therethrough, a loop member having its upper portion extending through said opening with its lower portion extending downwardly therefrom, and a stepped surface formed on the upper portion of said lower leg with the riser of said steps opposed to the front wall of said opening and spaced rearwardly therefrom a distance materially less than the front-to-rear thickness of the loop member upper portion, whereby when the upper portion of said loop member is positioned between said riser and said opening front wall and on the lower of said steps said loop member is held inclined with respect to the vertical.

2. Structure as specified in claim 1, wherein the loop member is concavo-convex in cross section.

3. Structure as specified in claim 1, wherein the loop member is semi-circular in cross section.

4. Structure as specified in claim 1, wherein the loop member is of circular configuration.

VICTOR I. ZELOV.

REFERENCES CITED

The following references are of record in the file of this patent:

FOREIGN PATENTS

| Number | Country | Date |
| --- | --- | --- |
| 870,191 | Morden | Nov. 5, 1907 |
| 1,957,177 | Lester | May 1, 1934 |